(12) United States Patent
Moon et al.

(10) Patent No.: US 7,092,434 B2
(45) Date of Patent: Aug. 15, 2006

(54) MOBILE STATION USED AS A REPEATER STATION WHEN COMMUNICATING WITH A BASE STATION

(75) Inventors: Sung Uk Moon, Yokosuka (JP); Toshiyuki Futakata, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 802 days.

(21) Appl. No.: 10/178,544

(22) Filed: Jun. 25, 2002

(65) Prior Publication Data
US 2002/0197969 A1    Dec. 26, 2002

(30) Foreign Application Priority Data
Jun. 25, 2001    (JP)    ............... 2001-191727

(51) Int. Cl.
*H04B 3/36* (2006.01)
(52) U.S. Cl. .................. 375/211; 178/70; 370/279; 370/293; 370/315; 370/492; 379/338; 455/7
(58) Field of Classification Search ................ 375/211; 455/442, 445; 370/315
See application file for complete search history.

(56) References Cited

U.S. PATENT DOCUMENTS 5,533,004 A * 7/1996 Jasper et al. ................ 370/204
5,949,773 A * 9/1999 Bhalla et al. ................ 370/331
6,161,024 A * 12/2000 Komara .................. 455/562.1

FOREIGN PATENT DOCUMENTS

| WO | WO 99/50989 | 10/1999 |
| WO | WO 00/54539 | 9/2000 |
| WO | WO 0054539 | * 9/2000 |

OTHER PUBLICATIONS

B. Willis, et al., Journal of the Institute of British Telecommunications Engine ERS, vol. 2, No. part 2, XP-001059211, pp. 48-53, "Exploiting Peer-to-Peer Communications-Mesh Fixed and ODMA Mobile Radio", Apr.-Jun. 2001.

* cited by examiner

*Primary Examiner*—Jay K. Patel
*Assistant Examiner*—Adolf Dsouza
(74) *Attorney, Agent, or Firm*—Oblon, Spivak, McClelland, Maier & Neustadt, P.C.

(57) ABSTRACT

When a mobile station communicates with a base station by way of one or a plurality of other mobile stations, the mobile station acting as a relay station determines whether the data demodulated after being received is reception data for the mobile station or transfer data to be transmitted to the other mobile station or the base station, decides a modulation mode suitable for transmitting sum data of the transfer data and transmission data if the transmission data is generated in the mobile station, and transmits the sum data while modulating the sum data according to the modulation mode decided. The base station demodulates a reception signal relayed by the mobile stations according to the modulation mode of the mobile station having directly communicated with the base station, and identifies each user data multiplexed.

11 Claims, 6 Drawing Sheets

SIGNAL POINTS OF QPSK

SIGNAL POINTS OF 16QAM

MOBILE STATION USED AS A REPEATER STATION WHEN COMMUNICATING WITH A BASE STATION

BACKGROUND OF THE INVENTION

1. Field of the Invention

The present invention relates to a mobile communication system, a mobile communication method and a mobile communication program in which a mobile station such as a cellular phone communicates with a base station by way of at least one other mobile station.

2. Related Background Art

Various communication schemes have conventionally been employed in digital mobile communication systems. In a system adopting the TDMA (Time Division Multiple Access) scheme, for example, the whole bandwidth is used, a predetermined time period (frame) is divided into a plurality of unit times (time slots), and each time slot is used as a communication channel. The CDMA/TDD (Code Division Multiple Access/Time Division Duplex) scheme in which each time slot is subjected to code division multiplexing has also been proposed.

Modulation modes used in mobile communication systems include those of phase shift modulation such as BPSK (Binary Phase Shift Keying), QPSK (Quadrature Phase Shift Keying) and 8PSK, and those of quadrature amplitude modulation such as 16QAM (Quadrature Amplitude Modulation) and 64QAM. By way of example, FIG. 4 shows signal points in the QPSK, whereas FIG. 5 shows those in the 16QAM.

The QPSK is a modulation mode for converting digital data to analog signals. It is used for efficiently transferring data in a limited bandwidth, since it expresses information by using both the amplitude and phase of a wave. As shown in FIG. 4, using two amplitude states and two phase states enables 2×2=4 values be represented in a single symbol.

As shown in FIG. 5, the 16QAM is one kinds of multiple value quadrature amplitude modulation capable of transmitting 4-bit (16-value) information with a single symbol. It can transmit a greater amount of information per symbol than the other digital modulation modes do, thereby being able to realize high-speed digital communications with a narrow bandwidth.

In conventional mobile communication systems, one of modulation modes may be set fixedly for each system or a plurality of modulation modes may be used adaptively. In the adaptive modulation mode in general, the amount of information that can be sent at once is increased by using a modulation mode having a greater number of modulation values if the communication quality is favorable, whereas a modulation mode having a smaller number of modulation values is used in order to reduce the influence of noise if the communication quality is unfavorable.

Also known as a transmission scheme is ODMA (Opportunity Driven Multiple Access). The ODMA is a communication scheme in which, as shown in FIG. 6, communications between a base station 50 and a mobile station 51, for example, are carried out by way of other mobile stations 52, 53. In this case, the mobile station 51 located in a low bit rate region can attain a higher bit rate communication by communicating with the base station 50 by way of the other mobile stations 52, 53.

SUMMARY OF THE INVENTION

When carrying out communications according to the ODMA scheme by utilizing a conventional mobile communication system, however, mobile stations in the process of communicating cannot be used as repeater (relay) stations, whereby the communications may not be established via their optimal routes.

For example, if mobile stations 54 and 55 are not in the process of communicating in FIG. 6, the mobile station 51 can communicate with the base station 50 via the shortest route indicated by the solid line by way of these mobile stations 54 and 55. If the mobile stations 54 and 55 are in the process of communicating, however, the mobile station 51 has to communicate with the base station 50 via a roundabout route indicated by broken line by way of the mobile stations 52 and 53. This case may be problematic in that the mobile station 51, base station 50 and whole mobile communication system consume a higher power than that in the case with the shortest route.

In view of such circumstances, it is an object of the present invention to provide a mobile station, a base station, a mobile communication system, a mobile communication method and a mobile communication program which enable communications via the optimal route having the lowest power consumption when a mobile station communicates with a base station in the ODMA scheme.

For achieving the above-mentioned object, the present invention provides a mobile station used as a repeater station when a mobile station communicates with a base station by way of at least one other mobile station in the ODMA scheme, such mobile station comprising determining means for determining whether data demodulated after being received is reception data for the mobile station or transfer data to be transferred to another mobile station or the base station; adding means for adding transmission data to the transfer data and outputting thus obtained sum data if the transmission data is generated in the mobile station, and outputting the transfer data alone if there is no transmission data; deciding means for deciding a modulation mode suitable for transmitting data outputted from the adding means according to an amount of the data; and modulating means for modulating the data outputted from the adding means according to the modulation mode decided by the deciding means.

In this configuration, in a mobile station which becomes a repeater station when carrying out communications in the ODMA scheme, transmission data of the mobile station is added to the transfer data of the other remote mobile station, whereby mobile stations in the process of communicating can be used as repeater stations. Since mobile stations in the process of communicating conventionally could not be used as repeater stations, there have been cases where communications cannot be established via the shortest routes to base stations. However, the present invention enables the communications via the optimal routes in which power consumption is minimized in the mobile stations, base stations and whole mobile communication system be established.

In another aspect, the present invention provides a mobile communication system employing the ODMA scheme allowing a mobile station to communicate with a base station by way of at least one other mobile station, such mobile communication system comprising a mobile station for determining whether data demodulated after being received is reception data for the mobile station or transfer data to be transferred to another mobile station or the base station, deciding a modulation mode suitable for transmitting sum data of transmission data and the transfer data according to an amount of the sum data if the transmission data is generated in the mobile station, and transmitting the sum data while modulating the sum data according to the modulation mode decided; and a base station for demodulating a reception signal relayed in the ODMA scheme according to a modulation mode of the mobile station having directly communicated with the base station, identifying each data item multiplexed and included in thus demodulated data, multiplexing data of a plurality of mobile stations, and transmitting thus multiplexed data to the mobile station.

In this configuration, in a mobile station used as a repeater station when carrying out communications in the ODMA scheme, transmission data of the mobile station is added to the transfer data from the other remote mobile station, so that mobile stations in the process of communicating can be used as repeater stations, whereby communications with base stations can be carried out via the shortest routes in which the transmission power is minimized. Namely, the communications can be established via the optimal routes in which power consumption in the mobile stations, base stations and whole mobile communication system is minimized. In a base station, the modulation can be performed optimally since the demodulation is carried out according to the modulation mode of the mobile station having directly communicated with the base station. Also, even when data generated in a plurality of mobile stations are multiplexed, the individual data items are identified. Further, since the data of mobile stations acting as repeater stations are multiplexed with the data of the end mobile station, efficient data transmission can be carried out.

In still another aspect, the present invention provides a mobile communication method for allowing a mobile station to communicate with a base station by way of at least one other mobile station in the ODMA scheme, such method comprising, in a mobile station, a determining step of determining whether data demodulated after being received is reception data for the mobile station or transfer data to be transferred to another mobile station or the base station; an adding step of adding transmission data to the transfer data and outputting thus obtained sum data if the transmission data is generated in the mobile station, and outputting the transfer data alone if there is no transmission data; a deciding step of deciding a modulation mode suitable for transmitting data obtained by the adding step according to an amount of the data; and a modulating step of modulating the data obtained by the adding step according to the modulation mode decided by the deciding step.

In this method, in a mobile station used as a repeater station when carrying out communications according to the ODMA scheme, transmission data of the mobile station is added to the transfer data from the other remote mobile station, whereby mobile stations in the process of communicating can be used as repeater stations. Since mobile stations in the process of communicating conventionally could not be used as repeater stations, there have been cases where communications cannot be established via the shortest routes to base stations. However, the present invention enables the communications via the optimal routes in which power consumption is minimized in the mobile stations, base stations and whole mobile communication system be established.

In still another aspect, the present invention provides a mobile communication program for allowing a mobile station to communicate with a base station by way of at least one other mobile station in the ODMA scheme, such program causing a computer to execute a determining step of determining whether data demodulated after being received is reception data for the mobile station or transfer data to be transferred to another mobile station or the base station; an adding step of adding transmission data to the transfer data and outputting thus obtained sum data if the transmission data is generated in the mobile station, and outputting the transfer data alone if there is no transmission data; a deciding step of deciding a modulation mode so as to attain a greater number of modulation values as the amount of data obtained by the adding step is greater; and a modulating step of modulating the data obtained by the adding step according to the modulation mode decided by the deciding step.

In this mobile communication program, in a mobile station which becomes a repeater station when causing a computer to execute the program so as to carry out communications in the ODMA scheme, the transmission data of the mobile station is added to the transfer data from the other remote mobile station, whereby mobile stations in the process of communicating can be used as repeater stations. Since mobile stations in the process of communicating conventionally could not be used as repeater stations, there have been cases where communications cannot be established via the shortest routes to base stations. However, the present invention enables the communications via the optimal routes in which power consumption is minimized in the mobile stations, base stations and whole mobile communication system be established.

DESCRIPTION OF THE PREFERRED EMBODIMENTS

In the following, embodiments of the present invention will be explained in detail with reference to the drawings.

Figure 1:
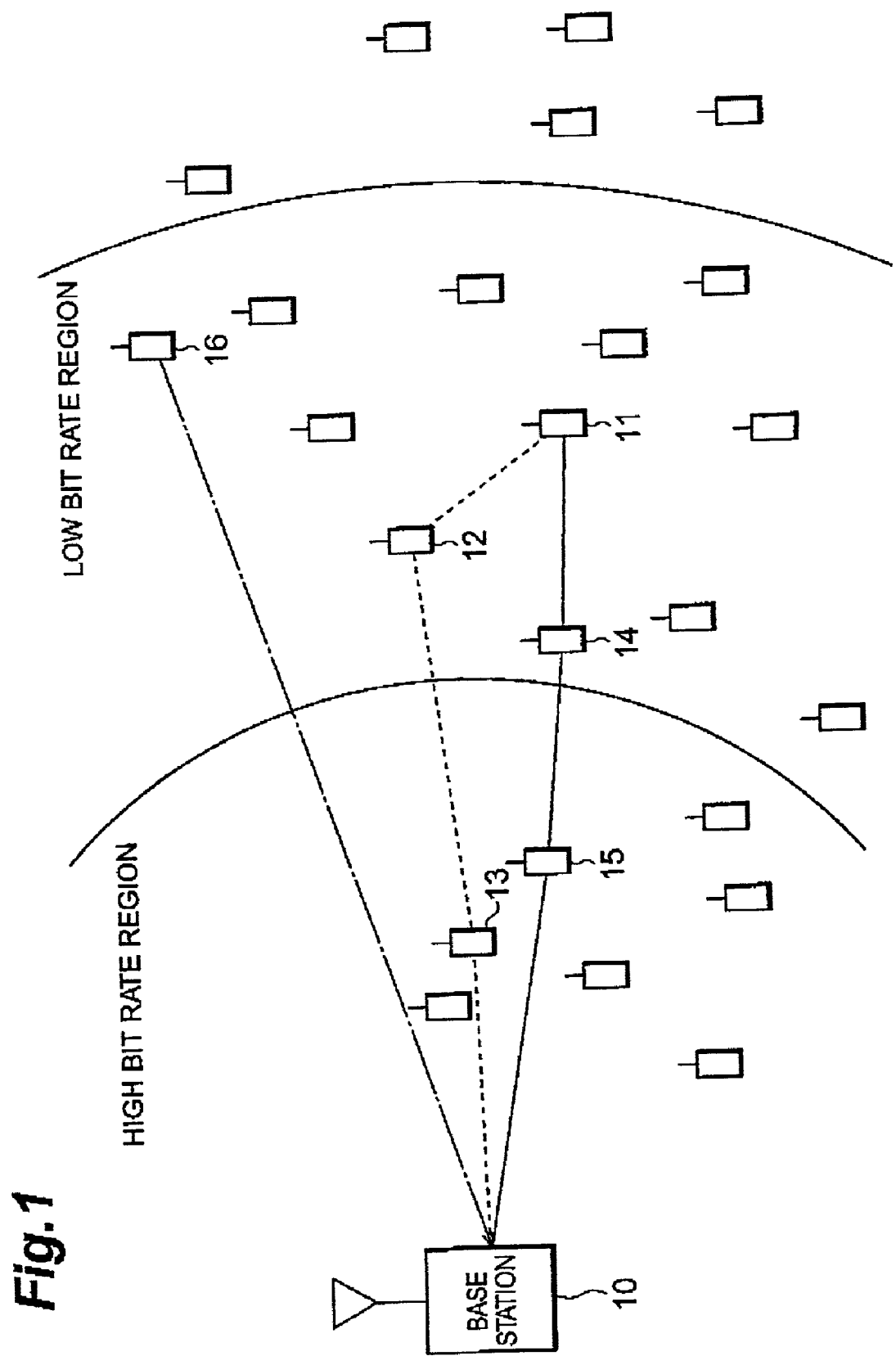
FIG. 1 is a block diagram showing the configuration of the mobile communication system in accordance with an embodiment of the present invention.

FIG. 1 is a block diagram showing the configuration of the mobile communication system in accordance with an embodiment of the present invention.

Figure 2:
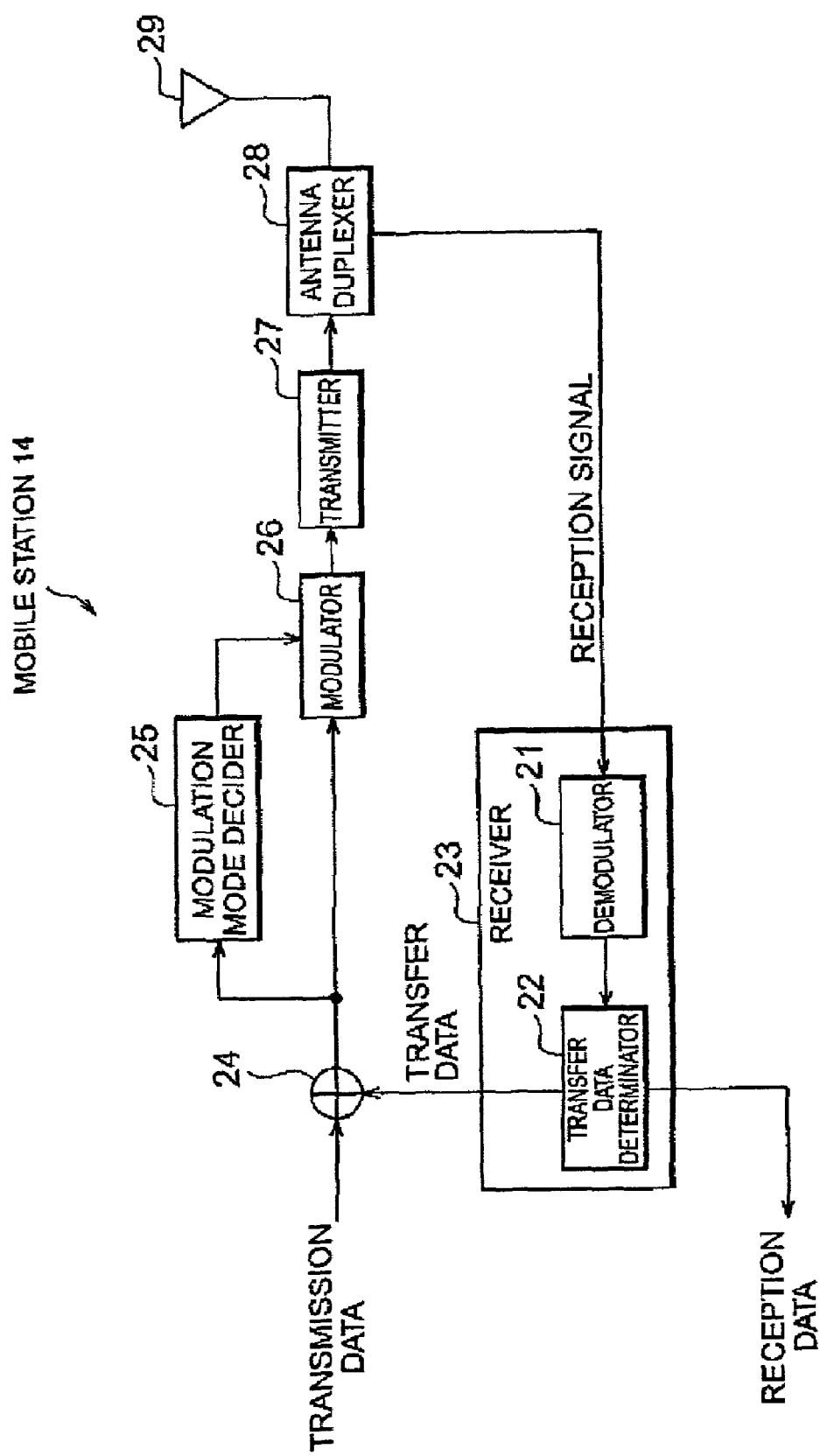
FIG. 2 is a block diagram showing the configuration of a mobile station in the above-mentioned mobile communication system.

The mobile communication system shown in FIG. 1 employs the ODMA as its communication scheme, whereas a plurality of mobile stations (some of which are referred to with numerals 11 to 16) are located in high and low bit rate regions which are areas covered by a base station 10. As shown in FIG. 2 the mobile station 14, representing mobile stations by way of example, is characteristically constituted by a receiver 23 having a demodulator 21 and a transfer data determinator 22, an adder 24, a modulation mode decider 25, a modulator 26, a transmitter 27, an antenna duplexer 28 and an antenna 29.

The demodulator 21 is used for demodulating reception signals received by way of the antenna 29 and antenna duplexer 28, and outputs thus demodulated data to the transfer data determinator 22.

The transfer data determinator 22 determines whether the demodulated data is reception data for the mobile station 14 or transfer data to be transferred to other mobile stations in an ODMA route or the base station 10. The transfer data determinator 22 outputs the data determined to be the reception data to reception data processing means, which is not depicted, and outputs the data determined to be the transfer data to the adder 24. The determination is carried out according to the code assigned to the mobile station 14, since the data has been subjected to CDMA processing. Namely, the discrimination between the reception data and the transfer data is carried out base on the correlation with the code assigned to the mobile station 14.

The adder 24 adds transmission data generated in the mobile station 14 to the transfer data, and outputs thus obtained sum data to the modulation mode decider 25 and the modulator 26. When the transmission data or transfer data does not exist, only the existing data is outputted to the modulation mode decider 25 and the modulator 26.

The modulation mode decider 25 decides a modulation mode according to the amount of the sum data (data amount) and a communication quality request, and outputs thus decided modulation mode to the modulator 26. Here, QoS (Quality of Service) and the like are used for selecting suitable modulation mode. When the data outputted from the adder 24 consists of transfer data alone, the modulation mode already employed in the transfer data is adopted. When the transmission data generated in the mobile station 14 exists in addition to the transfer data, thereby increasing the amount of data, a modulation mode capable of transmitting a greater amount of information (a greater number of modulation values) per symbol than the modulation mode already employed in the transfer data is adopted. For example, modulation mode is selected in the order of 64QAM, 16QAM, 8PSK, QPSK, and BPSK as the amount of data is greater. Thus, the modulation mode having a greater number of modulation values per symbol is employed as the amount of data is greater.

The modulator 26 modulates data outputted from the adder 24 according to thus decided modulation mode. The transmitter 27 carries out transmission processing for upconverting thus modulated transmission signal. Thus processed transmission signal is transmitted by way of the antenna duplexer 28 and the antenna 29.

Figure 3:
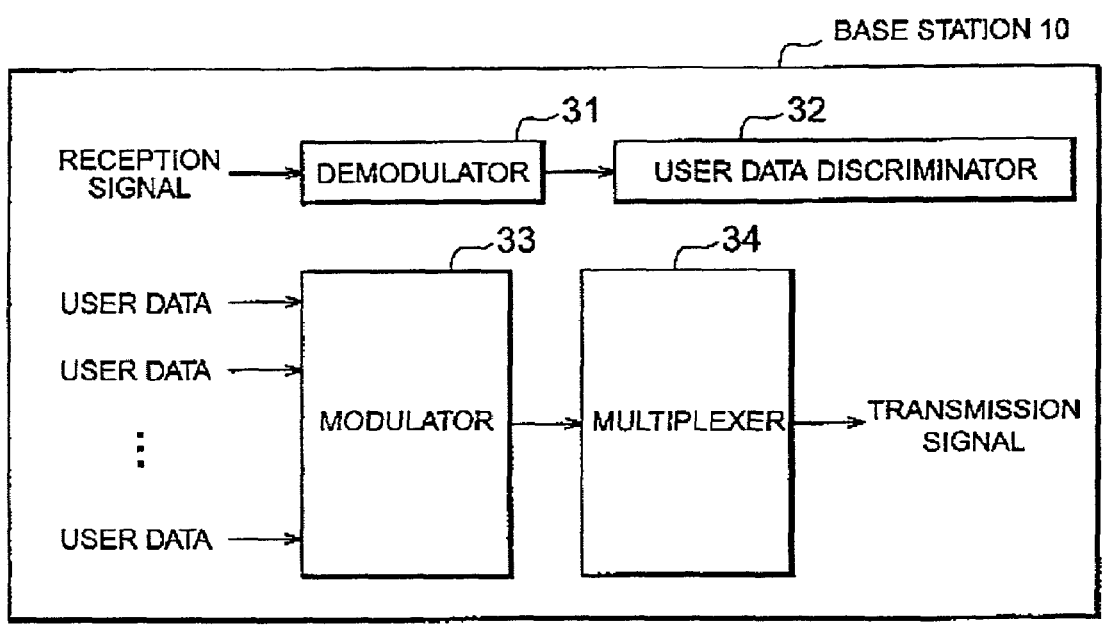
FIG. 3 is a block diagram showing the configuration of abase station in the above-mentioned mobile communication system.
Figure 4:
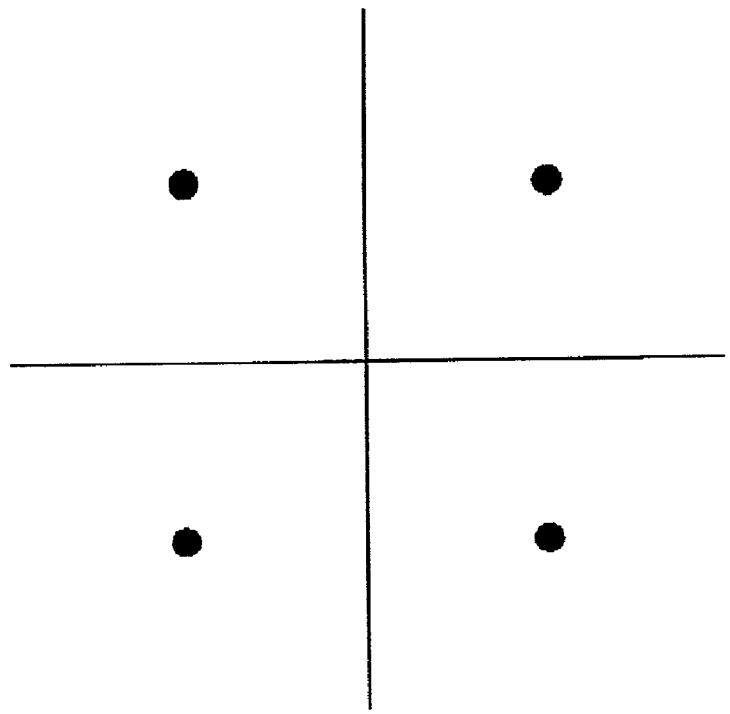
FIG. 4 is a chart showing signal points according to the QPSK modulation mode.
Figure 5:
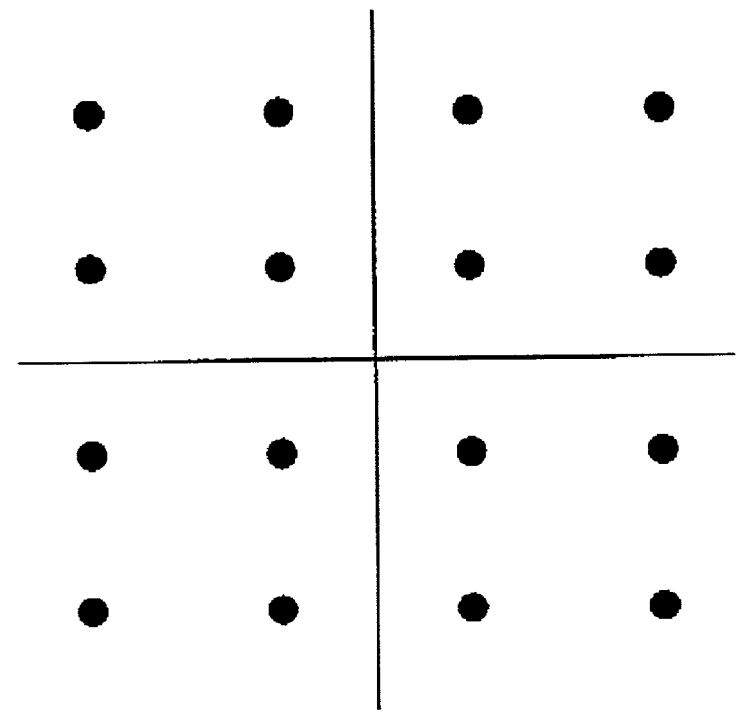
FIG. 5 is a chart showing signal points according to the 16QAM modulation mode.
Figure 6:
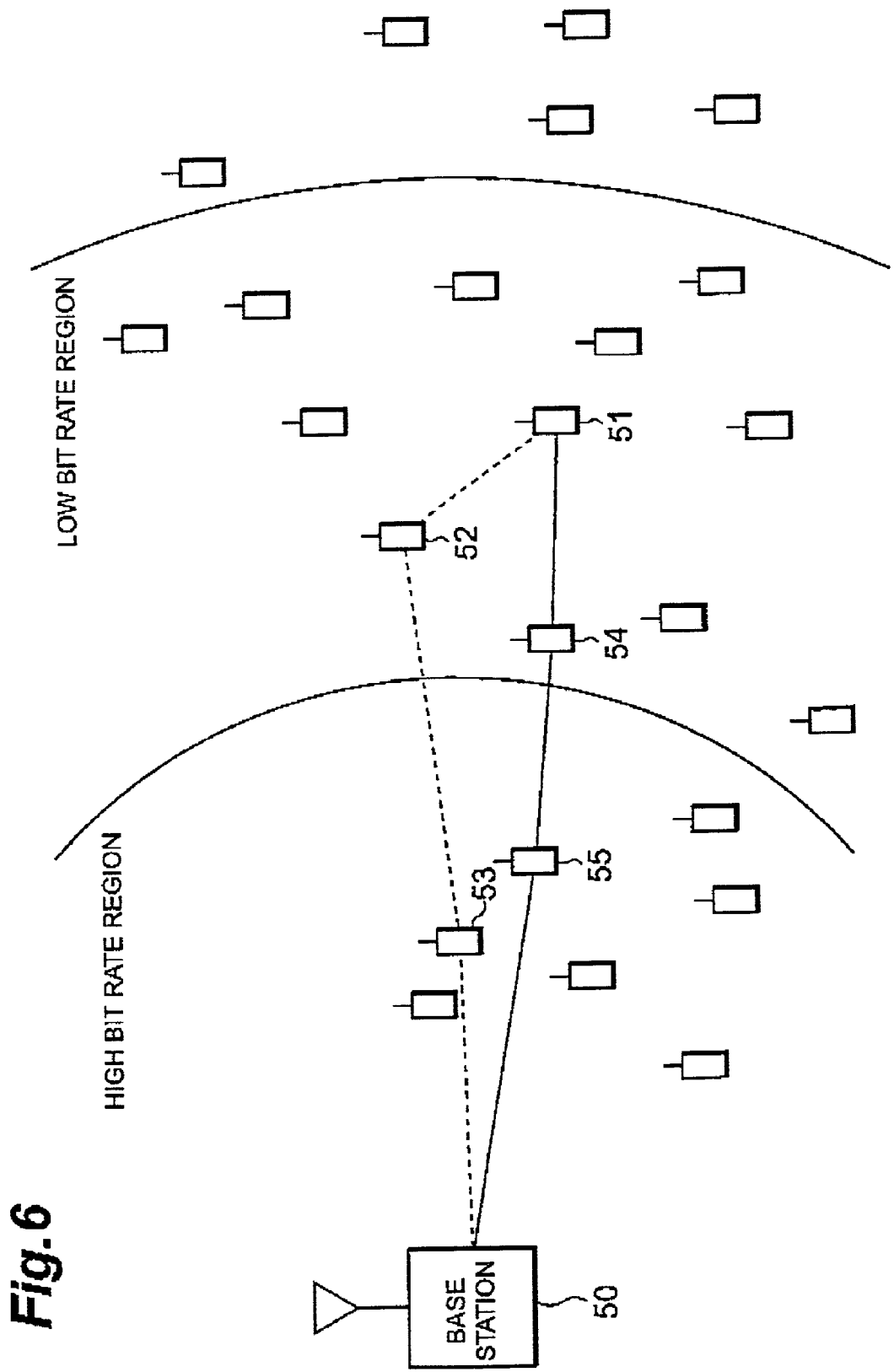
FIG. 6 is a block diagram showing the configuration of a conventional mobile communication system.

The configuration of the base station 10 will now be explained with reference to FIG. 3. As shown in FIG. 3, the base station 10 comprises a demodulator 31, a user data discriminator 32, a modulator 33 and a multiplexer 34.

The demodulator 31 demodulates the reception signal received by way of the ODMA route according to the modulation mode of the mobile station having directly communicated with the base station 10, and outputs thus demodulated data to the user data discriminator 32. Based on the code correlation, the user data discriminator 32 identifies the data of specified user out of multiplexed data.

The modulator 33 modulates a plurality of user data sets according to their data amounts and communication quality requests, and outputs thus modulated signals to the multiplexer 34. The multiplexer 34 multiplexes the individual modulated signals, and outputs thus multiplexed signal as a transmission signal.

Operations for communications according to the ODMA scheme in thus configured mobile communication system will now be explained.

Suppose, for example, that the mobile station 11 located in a low bit rate region within a communication area of the base station 10 communicates with the base station 10 via an uplink. In this case, without directly communicating with the base station 10 as with another mobile station 16 located in the same low bit rate region (see FIG. 1), the mobile station 11 initially communicates with the mobile station 14 and transmits the data for communications generated in the mobile station 11 to the mobile station 14.

In the mobile station 14, the signal from the mobile station 11 is received by the antenna 29, thus received signal is outputted to the demodulator 21 by way of the antenna duplexer 28 and is demodulated there, and thus demodulated data is outputted to the transfer data determinator 22.

In the transfer data determinator 22, whether the demodulated data is reception data for the mobile station 14 or transfer data to be transferred to other mobile stations or the base station 10 is determined based on code correlation. The data determined to be the reception data is outputted to the data processing means, whereas the data determined to be the transfer data is outputted to the adder 24. In the adder 24, the transmission data generated by the mobile station 14 and the transfer data are added together, and thus obtained sum data is outputted to the modulation mode decider 25 and the modulator 26.

In the modulation mode decider 25, the modulation mode is decided according to the amount of data outputted from the adder 24 and the communication quality required. For example, when the QPSK modulation mode is employed in transfer data while the amount of data is increased by adding the transmission data to the transfer data, the 8PSK, 16QAM and the like, which are modulation modes having a greater number of modulation values than those of the QPSK modulation mode, is adopted. Suppose that the 8PSK is employed here.

In the modulator 26, the data outputted from the adder 24 is modulated according to thus adopted 8PSK modulation mode. Thus modulated data is subjected to transmission processing such as upconverting in the transmitter 27. Thus processed data is transmitted by way of the antenna duplexer 28 and the antenna 29. Thus transmitted signal is relayed by another mobile station 15, so as to be sent to the base station 10.

In the base station 10, the signal received from the mobile station 15 is demodulated in the demodulator 31 according to the same modulation mode as that employed in the modulator of the mobile station 15, and thus demodulated signal is outputted to the user data discriminator 32. The user data discriminator 32 identifies the data of specified user out of multiplexed data, thereby receiving data for each user.

In the downlink directed from the base station 10 to the mobile station 11, the individual user data for the mobile stations 11, 14, 15 are modulated according to their data amounts, communication quality requests and the like, thus modulated signals are multiplexed in the multiplexer 34, and thus multiplexed signal is transmitted to the mobile station 15 as a transmission signal.

In the mobile station 15, the signal from the base station 10 is received by the antenna 29, thus received signal is outputted by way of the antenna duplexer 28 to the demodulator 21 and demodulated there, and thus demodulated data is outputted to the transfer data determinator 22.

In the transfer data determinator 22, the reception data for the mobile station 15 and the transfer data to be transferred to the mobile stations 14 and 11 on the downstream line of the ODMA route are determined according to the code correlation, the reception data for the mobile station 15 is outputted to reception processing means, and the transfer data is outputted to the adder 24.

In this case (the data transmission process of downstream route), there is no transmission data generated in the mobile station 15 to be sent to the downstream mobile stations 14 and 11, whereby the transfer data is outputted from the adder 24 to the modulation mode decider 25 and modulator 26. In the modulation mode decider 25, the modulation mode is determined according to the data amount outputted from the adder 24 and the communication quality required. For example, assuming that the 8PSK modulation mode is employed for the transmission data from the base station 10, the QPSK, which is a modulation mode having a smaller number of modulation values than 8PSK modulation mode, for instance, is adopted according to the data amount that has become smaller since the transfer data is left alone after subtracting the reception data for the mobile station 15.

In the modulator 26, the data outputted from the adder 24 is modulated according to thus decided QPSK modulation mode. Thus modulated data is subjected to transmission processing such as upconverting in the transmitter 27. Thus processed data is transmitted by way of the antenna duplexer 28 and the antenna 29. The transfer data for the mobile station 11 is similarly transmitted to the mobile station 11 by way of the mobile station 14.

Thus, in the mobile station according to this embodiment, the transfer data determinator 22 determines whether the data demodulated after being received is the reception data for the mobile station or the transfer data to be transmitted to other mobile stations or the base station 10, the adder 24 adds transmission data and the transfer data together and outputs thus obtained sum data if the transmission data is generated in the mobile station, and outputs the transfer data alone if there is no transmission data, the modulation mode decider 25 decides the modulation mode suitable for transmitting the data outputted from the adder 24 according to the amount of data and the like, and the modulator 26 modulates the data outputted from the adder 24 according to the modulation mode determined by the modulation mode decider 25.

As a consequence, when carrying out communications in the ODMA scheme, in a mobile station acting as a repeater station, transmission data of the mobile station is added to transfer data from the other remote mobile station, whereby mobile stations in the process of communicating can be used as repeater stations. Since mobile stations in the process of communicating conventionally could not be used as repeater stations, there have been cases where communications cannot be established via the shortest routes to the base station. However, according to the present invention, communications with base stations can be carried out via the shortest routes in which the transmission power is minimized, since mobile stations in the process of communicating can be used as repeater stations. Namely, the communications can be established via the optimal routes in which power consumption of the mobile stations, base stations or whole mobile communication system can be minimized.

Also, the modulation mode decider 25 employs a modulation mode having a greater number of modulation values per symbol, as the amount of data outputted from the adder 24 is greater. As a consequence, even when the amount of data to be transmitted increases in a mobile station acting as a repeater station, a modulation mode having a greater number of modulation values per symbol can be employed as the data amount is greater, whereby data can be transmitted without lowering the transmission speed.

In the base station 10, the demodulator 31 demodulates the reception signal relayed by the mobile station 14, 15 according to the modulation mode of the mobile station 15 having directly communicated with the base station 10, and the user data discriminator 32 identifies each user data (mobile station data) out of multiplexed data.

As a consequence, in the base station 10, the demodulation is carried out according to the modulation mode of the mobile station 15 having directly communicated with the base station 10, whereby demodulation can be carried out optimally. And even when respective data items generated in a plurality of mobile stations are multiplexed, the individual data items are identified by the user data discriminator 32.

Also, in the base station 10, a plurality of user data items are multiplexed by the multiplexer 34, and thus multiplexed data is transmitted to a mobile station. As a consequence, the reception data for the end mobile station 11 can be transmitted by way of the mobile station 15, 14, while the mobile station 15,14 receiving their reception data respectively, whereby data transmission can efficiently be carried out.

Figure 7:
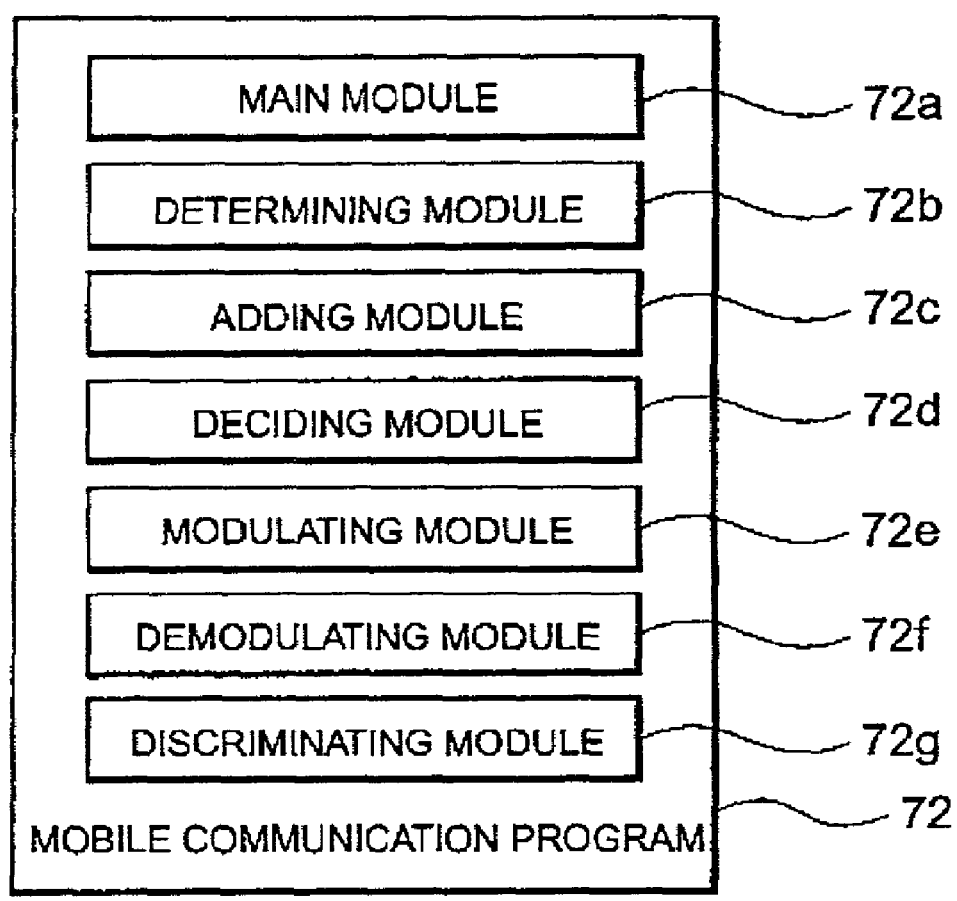
FIG. 7 is a diagram of a program in accordance with an embodiment of the present invention.

Finally, the mobile communication program in accordance with an embodiment of the present invention will be explained. FIG. 7 is a diagram of the mobile communication program in accordance with an embodiment of the present invention. This mobile communication program 72 is one causing a computer (a mobile station or base station) to carry out communications in the ODMA scheme such that the computer (the mobile station) relay the transmission signal of the other remote mobile station to the base station or the other mobile station closer to the base station while under the process of communicating or one causing the computer (the base station) optimally demodulate thus relayed reception signal and identify each individual user data out of multiplexed data. As shown in FIG. 7, the mobile communication program 72 comprises a determining module for determining whether data demodulated after being received is reception data for the mobile station or transfer data to be transferred to the other mobile station or the base station; an adding module for adding transmission data to the transfer data and outputting thus obtained sum data if the transmission data is generated in the mobile station, and outputting the transfer data alone if there is no transmission data; a deciding module for deciding a modulation mode so as to attain a greater number of modulation values as the amount of data obtained by the adding step is greater; a modulating module for modulating the sum data obtained by the adding module according to the modulation mode decided by the deciding module; a demodulating module for demodulating a reception signal relayed by the mobile stations according to the modulation mode of the mobile station having directly communicated with the base station; and a discriminating module for identifying each item of mobile station data multiplexed.

What is claimed is:

1. A mobile station used as a repeater station when a mobile station communicates with a base station by way of at least one other mobile station in an Opportunity Driven Multiple Access (ODMA) scheme, said mobile station comprising:

determining means for determining whether data demodulated after being received is reception data for said mobile station or transfer data to be transferred to the other mobile station or the base station;

adding means for adding transmission data to said transfer data and outputting thus obtained sum data if said transmission data is generated in the mobile station, and outputting said transfer data alone if there is no transmission data;

deciding means for deciding a modulation mode suitable for transmitting data outputted from said adding means according to an amount of said data; and modulating means for modulating said data outputted from said adding means according to said modulation mode decided by said deciding means.

2. A mobile station according to claim 1, wherein said deciding means employs a modulation mode having a greater number of modulation values as said data outputted from said adding means has a greater amount.

3. A base station comprising:

demodulating means for demodulating a reception signal relayed by the mobile station according to claim 1 according to a modulation mode of the mobile station having directly communicated with said base station; and discriminating means for identifying each data item multiplexed and included in said data demodulated by said demodulating means.

4. A base station according to claim 3, further comprising multiplexing means for multiplexing data corresponding to a plurality of mobile stations, said data multiplexed by said multiplexing means being transmitted to one of said mobile stations.

5. A mobile communication system employing an Opportunity Driven Multiple Access (ODMA) scheme allowing a mobile station to communicate with a base station by way of at least one other mobile station, said mobile communication system comprising:

a mobile station for determining whether data demodulated after being received is reception data for said mobile station or transfer data to be transferred to the other mobile station or the base station, deciding a modulation mode suitable for transmitting sum data of transmission data and said transfer data according to an amount of said sum data if said transmission data is generated in said mobile station, and transmitting said sum data while modulating said sum data according to said modulation mode decided; and a base station for demodulating a reception signal relayed in said ODMA scheme according to a modulation mode of the mobile station having directly communicated with said base station, identifying each data item multiplexed and included in thus demodulated data, multiplexing data to be transmitted to a plurality of mobile stations, and transmitting thus multiplexed data to said mobile station.

6. A mobile communication method for allowing a mobile station to communicate with a base station by way of at least one other mobile station in an Opportunity Driven Multiple Access (ODMA) scheme, said method comprising:

a determining step of determining whether data demodulated after being received is reception data for said mobile station or transfer data to be transferred to the other mobile station or the base station;

an adding step of adding transmission data to said transfer data and outputting thus obtained sum data if said transmission data is generated in said mobile station, and outputting said transfer data alone if there is no transmission data;

a deciding step of deciding a modulation mode suitable for transmitting data obtained by said adding step according to an amount of said data; and a modulating step of modulating said data obtained by said adding step according to said modulation mode decided by said deciding step.

7. A mobile communication method according to claim 6, wherein said deciding step employs a modulation mode having a greater number of modulation values as said data outputted in said adding step has a greater amount.

8. A mobile communication method according to claim 6, further comprising in the base station:

a demodulating step of demodulating a reception signal relayed by said mobile station according to a modulation mode of the mobile station having directly communicated with said base station; and discriminating step of identifying each data item multiplexed and included in said data demodulated by said demodulating step.

9. A mobile communication method according to claim 8, further comprising in said base station, a multiplexing step of multiplexing data corresponding to a plurality of mobile stations, said data multiplexed by said multiplexing step being transmitted to one of said mobile stations.

10. A mobile communication program for allowing a mobile station to communicate with a base station by way of at least one other mobile station in an Opportunity Driven Multiple Access (ODMA) scheme, said program causing a computer to execute:

a determining step of determining whether data demodulated after being received is reception data for said mobile station or transfer data to be transferred to the other mobile station or the base station;

an adding step of adding transmission data to said transfer data and outputting thus obtained sum data if said transmission data is generated in said station, and outputting said transfer data alone if there is no transmission data;

a deciding step of deciding a modulation mode so as to attain a greater number of modulation values as the amount of data obtained by said adding step is greater; and a modulating step of modulating said data obtained by said adding step according to said modulation mode decided by said deciding step.

11. A mobile communication program according to claim 10, further causing said computer to execute:

a demodulating step of demodulating a reception signal relayed by said mobile station according to a modulation mode of the mobile station having directly communicated with said base station; and discriminating step of identifying each data item multiplexed and included in said data demodulated by said demodulating step.

* * * * *